US006851643B2

(12) United States Patent
Qiu et al.

(10) Patent No.: US 6,851,643 B2
(45) Date of Patent: Feb. 8, 2005

(54) SPIRALLY WOUND TUBE WITH ENHANCED INNER DIAMETER STIFFNESS, AND METHOD OF MAKING SAME

(75) Inventors: Yanping Qiu, Middleton, WI (US); Johannes W. van de Camp, Hartsville, SC (US); Mark P. Burns, Hartsville, SC (US); Xiaokai Niu, Hartsville, SC (US); Cliff A. Bellum, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 10/352,312

(22) Filed: Jan. 27, 2003

(65) Prior Publication Data

US 2004/0144885 A1 Jul. 29, 2004

(51) Int. Cl.[7] .......................... B65H 75/10; F16L 9/16; B31C 3/00

(52) U.S. Cl. ............................... 242/609.4; 242/610.1; 242/118.32; 138/144; 156/195; 156/429; 428/34.2; 428/37

(58) Field of Search .......................... 242/609.4, 610.1, 242/118.32, 188.8, 118.8; 138/144, 129, 130; 156/195, 429, 430; 428/34.2, 37

(56) References Cited

U.S. PATENT DOCUMENTS

| | | | | | |
|---|---|---|---|---|---|
| 2,336,540 | A | * | 12/1943 | Graves | 138/144 |
| 2,751,936 | A | | 6/1956 | Dunlap et al. | |
| 3,086,558 | A | | 4/1963 | MacGill et al. | |
| RE26,273 | E | * | 9/1967 | Kennedy | 138/144 |
| 3,364,955 | A | * | 1/1968 | Gustafson | 138/144 |
| 3,616,819 | A | * | 11/1971 | Dunlap et al. | 138/144 |
| 3,813,026 | A | | 5/1974 | Biancamaria | |
| 4,026,690 | A | | 5/1977 | McClellan | |
| 4,462,556 | A | * | 7/1984 | Graham | 242/118.32 |
| 5,167,994 | A | | 12/1992 | Paulson | |
| 5,393,582 | A | | 2/1995 | Wang et al. | |
| 5,472,154 | A | * | 12/1995 | Qiu et al. | 242/609.4 |
| 5,505,395 | A | | 4/1996 | Qiu et al. | |
| 5,579,809 | A | * | 12/1996 | Millward et al. | 138/144 |
| 5,671,897 | A | | 9/1997 | Ogg et al. | |
| 5,865,396 | A | | 2/1999 | Ogg et al. | |
| 6,036,139 | A | | 3/2000 | Ogg | |
| 6,309,717 | B1 | | 10/2001 | Qiu et al. | |

FOREIGN PATENT DOCUMENTS

| | | | |
|---|---|---|---|
| CH | 549 523 | | 5/1974 |
| CH | 659 034 A5 | | 12/1986 |
| JP | 6-115827 | * | 4/1994 |
| JP | 9 234808 | | 9/1997 |

OTHER PUBLICATIONS

International Search Report; PCT Application No. PCT/US03/08594, Filed Mar. 21, 2003; Date of Completion Oct. 10, 2003; Date Mailed Feb. 17, 2004.

* cited by examiner

*Primary Examiner*—John M. Jillions
(74) *Attorney, Agent, or Firm*—Alston & Bird LLP

(57) ABSTRACT

Wide ply gaps are intentionally introduced into one or more plies in a radially intermediate zone of the wall of a spirally wound tube. Each ply having wide ply gaps is narrower than the width that would ordinarily be employed at a given spiral winding angle to achieve a butt joint between adjacent edges of consecutive turns of the ply, and the ply is wound at that given spiral winding angle in such a manner that gaps are defined between the adjacent edges of the consecutive turns of the ply. The wide ply gaps have the effect of increasing the compliance of the intermediate zone of the tube wall in the radial direction. Such increased radial compliance has been found to improve the ID stiffness of the tube relative to a tube constructed of the same materials but having no ply gaps in the intermediate zone.

23 Claims, 3 Drawing Sheets

SPIRALLY WOUND TUBE WITH ENHANCED INNER DIAMETER STIFFNESS, AND METHOD OF MAKING SAME

FIELD OF THE INVENTION

The invention relates to tubes made by spirally winding a plurality of paperboard plies about a forming mandrel and adhering the plies together.

BACKGROUND OF THE INVENTION

Spirally wound tubes are used in a variety of applications in which radially inward compressive forces are imposed on the outside diameter of the tubes. For example, continuous materials such as paper, plastic film, metal sheet, and textiles are commonly wound about winding cores formed of spirally wound paperboard tubes. The winding tension required for winding a stable roll of such materials results in substantial compressive forces being exerted by the wound material on the tube in the radially inward direction. Such forces are in a direction to tend to force the inner diameter of the tube to shrink in size. This phenomenon has been referred to as "ID comedown."

The degree to which a given paperboard tube resists such inner diameter reduction under a given load is referred to herein as the ID stiffness of the tube. The ID stiffness may be expressed as the amount of radially inward uniform compressive pressure on the tube OD that the tube can withstand for a given amount of inner diameter reduction; thus, for instance, the ID stiffness may have units of psi per inch of inner diameter reduction.

In web winding applications, it is desirable to have a high ID stiffness so that the tube can readily be removed from a winding apparatus after a roll of web material is wound onto the tube. A winding apparatus typically includes some type of chuck or mandrel that is inserted into the tube and is radially expanded to grip the core from the inside. If the tube inner diameter shrinks too much as a result of the forces imposed by the wound material, it can be difficult or impossible to remove the tube from the winding apparatus without destroying the tube.

The assignee of the present application has previously discovered that the tendency of a winding core to experience ID comedown can be reduced by forming the core wall to have a radially central region whose compliance in the radial direction is increased relative to that of the core wall regions lying radially inward and radially outward of the central region. See, for example, U.S. Pat. No. 5,505,395, incorporated herein by reference. In the '395 patent, this increased compliance was achieved by using paperboard plies of lower density and strength in the central region of the wall relative to the density and strength of the plies lying radially inward and outward of the central region.

While the approach represented by the '395 patent is effective in enhancing the ID stiffness of tubes, it would be desirable to be able to achieve even greater gains in ID stiffness, and to do so in a cost-effective manner.

SUMMARY OF THE INVENTION

The present invention addresses the above needs and achieves other advantages, by intentionally introducing wide ply gaps into one or more plies in a radially intermediate zone of the tube wall between the innermost and outermost plies of the tube. Each ply having wide ply gaps is narrower than the width that would ordinarily be employed at a given spiral winding angle to achieve a butt joint between adjacent edges of consecutive turns of the ply, and the ply is wound at that given spiral winding angle in such a manner that gaps are defined between the adjacent edges of the consecutive turns of the ply. The wide ply gaps have the effect of increasing the compliance of the intermediate zone of the tube wall in the radial direction. Such increased radial compliance has been found to improve the ID stiffness of the tube relative to a tube constructed of the same materials but having no ply gaps in the intermediate zone. The invention thus gives the tube designer another parameter that can be manipulated to achieve the desired ID stiffness for a particular application. The invention runs completely contrary to the ordinary convention used in winding tubes, wherein the plies all have substantially the same width or become wider by small increments from the inside diameter to the outside diameter of the tube to attempt to achieve a butt joint in each ply.

The intermediate zone of the tube wall can include more than one ply having wide ply gaps. The plies having gaps can be contiguous with one another; alternatively, plies having gaps and plies having no gaps can be alternated in the radial direction. Where there are a plurality of plies having gaps, the gaps of the various plies preferably are axially staggered relative to one another.

The gaps between adjacent edges of consecutive turns of a ply preferably have a width from about 6.5 percent to about 50 percent of the width of a normal "full-width" ply (i.e., the width that would produce a butt joint when the full-width ply is wound at the same spiral wind angle as the actual ply), and more preferably about 10 to 40 percent of the full ply width. Thus, for example, for a full-width ply that is 4 inches wide, the gaps preferably are from about 0.26 inch to about 2.0 inches wide, and more preferably about 0.4 to 1.6 inches wide.

If desired, each ply having gaps can be made of a material have greater compliance than that of other plies of the tube not having gaps. In this way, the effective compliance of the ply in the radial direction of the tube can be increased still further. For instance, the plies in the radially inwardly located and radially outwardly located zones of the tube wall can be selected to have a relatively high modulus while plies in the radially intermediate zone can be selected to have a relatively lower modulus, and one or more of the intermediate plies can have ply gaps.

In preferred embodiments of the invention, all of the plies of the tube are wound at substantially the same spiral wind angle α. Thus, based on the geometry of spiral winding, to achieve a perfect butt joint in a ply wound at the spiral wind angle α (measured from the axis of the tube), the width of the ply $W_i$ must be equal to $$W_i = \pi D_i \cos\alpha,$$

where $D_i$ is the diameter at which the ply is wound. In accordance with the invention, however, in the intermediate zone of the tube wall (i.e., somewhere between a radially outermost and a radially innermost ply of the tube) there is at least one ply whose width is given by $$W = k_i \cdot \pi D_i \cos\alpha,$$

where $k_i$ is a scalar having a value from about 0.5 to about 0.935, and more preferably from about 0.6 to 0.9. Thus, gaps exist between adjacent edges of consecutive turns of the intermediate ply, the intermediate ply having an increased compliance in the radial direction of the tube by virtue of the gaps. Where there are two or more plies having gaps, those plies can have different scalars $k_i$ and hence different gap widths, or the scalars and gap widths can be the same.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
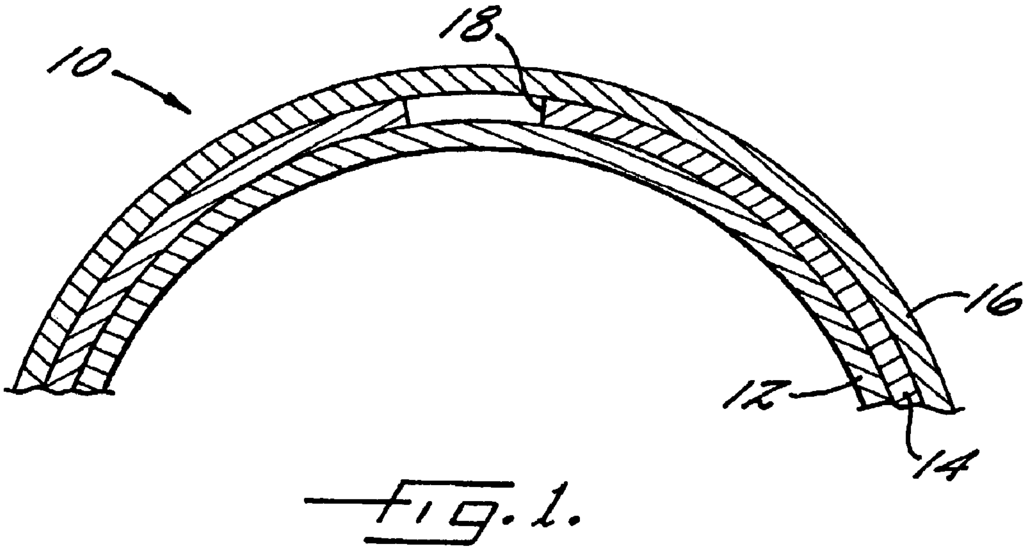
FIG. 1 is a fragmentary cross-sectional view of a tube in accordance with one embodiment of the invention having three structural plies wherein the middle ply has gaps.
Figure 1A:
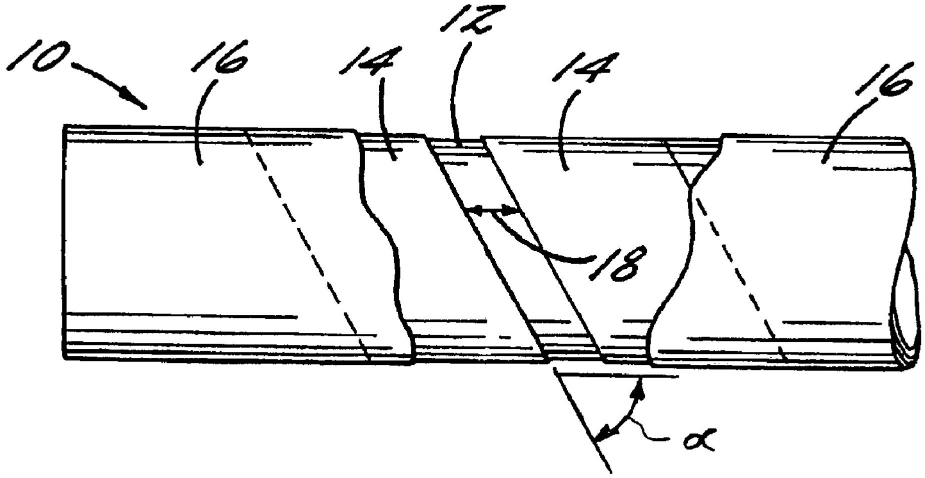
FIG. 1A shows an elevation of the tube of FIG. 1, with the outer ply of the tube partially broken away to show the middle ply

FIGS. 1 and 1A depict a spirally wound tube 10 in accordance with the simplest form of the invention having only three plies 12, 14, and 16. The innermost ply 12 and the outermost ply 16 are wound so that nominally they have no gaps between adjacent edges of consecutive turns of each ply. By "nominally" is meant that the objective is to wind the inner and outer plies so that a perfect butt joint exists between the edges of those plies. However, in practice, a perfect butt joint may not always be achieved, and small gaps may inadvertently be created between the edges of the plies. In general, such inadvertent gaps will be relatively small.

In contrast, for the intermediate ply 14, a relatively wide gap 18 is intentionally created between the adjacent edges of consecutive turns of the ply. The gap 18 extends helically along the tube at the spiral wind angle $\alpha$ at which the ply 14 is wound. The ply gap 18 is created in preferred embodiments of the invention by winding the ply 14 at the same spiral wind angle $\alpha$ at which the other plies 12, 16 are wound, but selecting the width of the ply 14 to be narrower than that of the plies 12, 16.

More particularly, it is known from geometrical considerations applicable to spiral winding that to achieve a perfect butt joint, the width of an individual ply, $W_i$, is related to the spiral wind angle $\alpha$ and the diameter $D_i$ at which the ply is wound by the equation $$W_i = \pi D_i \cos\alpha.$$

Thus, based on the known diameters at which the inner ply 12 and outer ply 16 are to be wound, and the known spiral wind angle $\alpha$, the ply widths of the inner and outer plies can be determined that will yield perfect butt joints under idealized winding conditions. In practice, plies may be available only in certain selected widths, and hence the spiral wind angle may have to be adjusted somewhat to satisfy the above equation with the available ply widths, and/or an available ply whose width approximates the theoretically optimum width according to the above equation can be used and a small gap or small overlap can be tolerated between the edges of the ply. Such small gaps that result not from the tube designer's intent but rather from the limitations and constraints on ply material availability and/or from inaccuracies in controlling the ply width and/or winding angle are referred to herein as "inadvertent" ply gaps. Such inadvertent gaps are usually relatively small (e.g., less than 0.25 inch) under good quality control conditions. Thus, the inner and outer plies 12 and 16 have either no gaps or at most relatively small inadvertent gaps between their ply edges.

The intermediate ply 14 is intentionally provided with gaps by selecting the width of the ply to be less than the width that would ordinarily be used to produce a butt joint as dictated by the above equation. Expressed in equation form, the width of the ply having intentional ply gaps is given by $$W = k_i \pi D_i \cos\alpha,$$

where $k_i$ is a scalar ranging in value from about 0.5 to about 0.935, and more preferably from about 0.6 to about 0.9. In other words, the ply width is from 50 to 93.5 percent (more preferably from 60 to 90 percent) of the width that would ordinarily be used to achieve a perfect butt joint (i.e., zero gap). As a result, the gap produced between the edges of the ply is about 6.5 to 50 percent of the normal width of the ply, and more preferably about 10 to 40 percent of the normal ply width.

Figure 4:
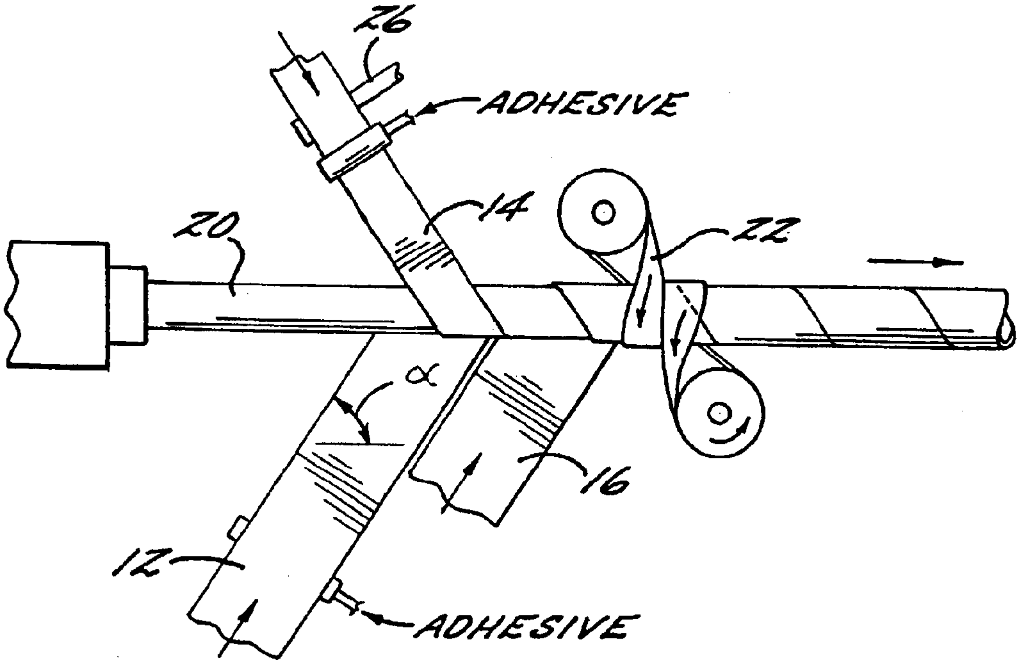
FIG. 4 is a diagrammatic top elevation of an apparatus for forming a tube in accordance with the invention, showing three plies being wound onto a forming mandrel with the middle ply being narrower than the other two plies.

FIG. 4 shows a process for making the three-ply tube of FIGS. 1 and 1A. The inner ply 12 is spirally wound onto a cylindrical mandrel 20. Adhesive is applied to the outward-facing surface of the ply 12. Next, the intermediate ply 14 is wound onto the inner ply 12 and adhesive is applied to the outward-facing surface of the ply 14. Finally, the outer ply 16 is wound onto the intermediate ply 14. All of the plies are wound at the same spiral wind angle $\alpha$. The plies are adhered together by the adhesive applied to their opposing faces, so as to form a tube on the mandrel. A winding belt 22 rotates the tube in a screw fashion such that the tube advances down the mandrel (to the right in FIG. 4). The tube is then cut into discrete lengths by a suitable cut-off device (not shown).

As shown, the intermediate ply 14 is narrower than the inner and outer plies. Consequently, a gap 18 is produced between the adjacent edges of consecutive turns of the ply 14, as best seen in FIG. 1A.

To maintain the narrower ply 14 in the proper axial position as it is wound onto the mandrel so that the gap 18 is generally uniform along the tube, the apparatus preferably includes a ply positioning arrangement. The ply positioning arrangement can comprise an edge stop 26 or the like along which an edge of the ply is guided. The edge stop 26 can be adjusted in axial position to properly position the ply so that it is wound in such a manner that the desired gap is produced between the ply edges. Instead of an edge stop, other ply positioning mechanisms can be used. It is also possible to adhere the narrower ply 14 to one of the wide (i.e., normal-width) plies of the tube prior to winding to form a two-ply laminate structure, and to then wind the two-ply laminate onto the mandrel in essentially the same manner that the other wide plies are wound.

Figure 2:
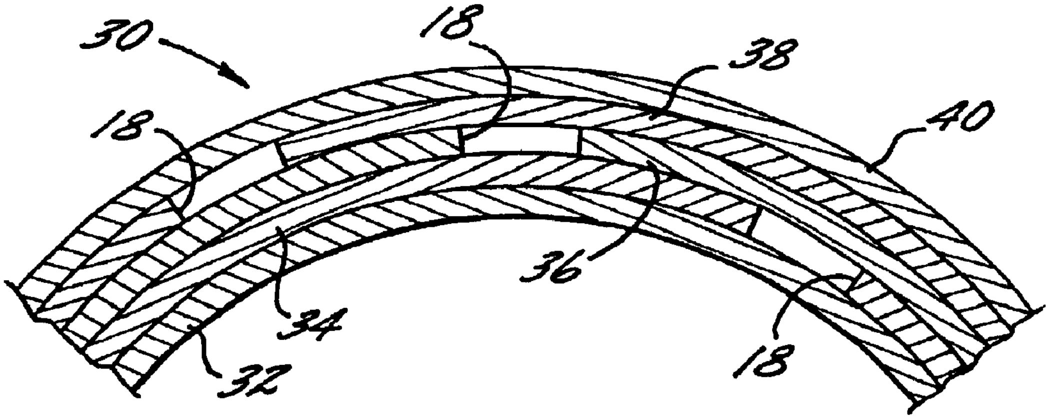
FIG. 2 is a view similar to FIG. 1 showing an alternative embodiment of the invention having five structural plies wherein the three contiguous middle plies have gaps that are staggered.
Figure 2A:
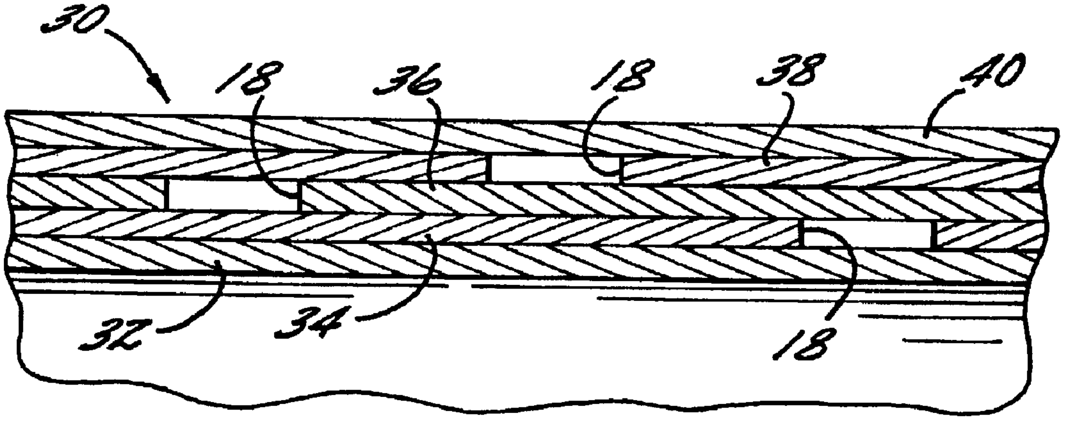
FIG. 2A is an axial cross-sectional view of a portion of the tube of FIG. 2, showing the staggered gaps.

The invention is applicable to tubes having various numbers of plies and various types of plies. For instance, FIGS. 2 and 2A depict a tube 30 made up of five plies 32, 34, 36, 38, and 40 from inside to outside. Each of the intermediate three plies 34, 36, 38 has gaps 18 between adjacent edges of the ply, while the innermost and outermost plies do not have gaps. As illustrated, the gaps 18 in contiguous plies (plies 34 and 36, and plies 36 and 38) are staggered relative to each other so that preferably a gap in one ply does not overlap even partially with a gap in an adjacent ply. By staggering the gaps, preferably the gaps are distributed in a generally uniform way throughout the intermediate zone of the tube wall.

Figure 3:
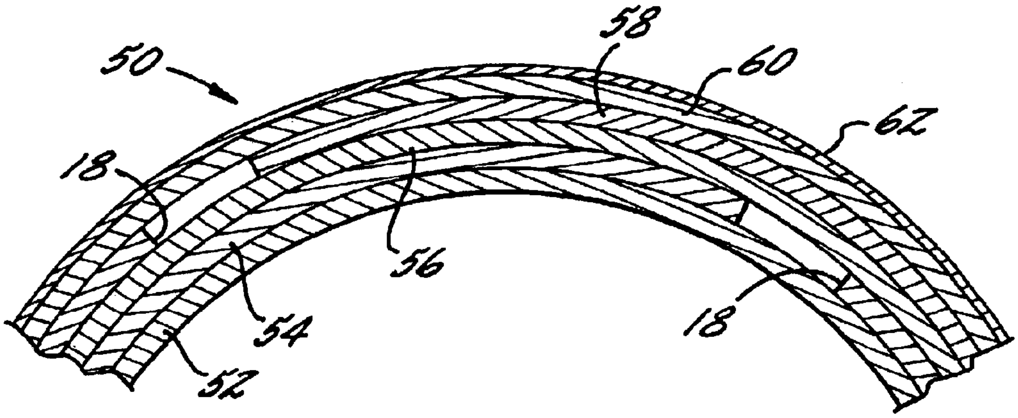
FIG. 3 is a view similar to FIGS. 1 and 2 showing another embodiment of the invention having five structural plies wherein the central ply does not have gaps and the plies on either side of the central ply have gaps.

FIG. 3 shows yet another embodiment of the invention in the form of a tube 50 having six plies 52, 54, 56, 58, 60, and 62. The tube 50 differs from the previously described tube 30 in that the central ply 56 in the tube 50 does not have gaps, while the non-contiguous plies 54 and 58 on either side of the central ply have gaps 18. The tube 50 also differs in that a substantially thinner outside ply 62 is included. Such a ply can be included to achieve a particular property at the outer surface of the tube, such as a smooth surface finish, a particular color, etc. It is also possible to include such a ply as the innermost ply of the tube if a particular property is needed at the inside surface of the tube.

The invention is applicable to multi-grade paperboard tubes having plies of various grades of paperboard within the same tube wall. For instance, since one objective of introducing wide ply gaps into the intermediate zone of the tube wall is to increase the compressibility or compliance of the zone in the radial direction, it may be advantageous to form the intermediate zone at least in part from paperboard having a greater compliance than that used in the radially inwardly and radially outwardly located zones of the tube wall. As an example, in the tube 30 of FIGS. 2 and 2A, the inner and outer plies 32 and 40 can comprise paperboard having a relatively low compliance, and the intermediate plies 34, 36, and 38 can comprise paperboard having a relatively greater compliance. Lower-compliance paperboard generally is a higher grade of paperboard, which typically has a higher density than paperboard of greater compliance.

Four different configurations of paperboard tubes were constructed and tested to determine their ID stiffness. All tubes had 14 or 15 plies making up a wall thickness of 0.300 inch in each case. The tubes had an inner diameter of 3.701 inches (94 mm) and an outer diameter of 4.301 inches (109 mm), and all plies were wound at a spiral wind angle of 70°. A first configuration had 15 plies of a relatively high-density paperboard (referred to herein as Board A) of nominally 4 inch width and caliper of 0.020 inch, with no gaps in any of the plies. A second configuration had 5 inner plies and 4 outer plies of the same high-density Board A of nominally 4 inch width, and 5 intermediate plies of approximately 4-inch wide low-density paperboard (referred to herein as Board B) of 0.024 inch caliper; again, none of the plies had gaps. A third configuration was similar to the second, but the 5 intermediate plies of Board B were approximately 3 inches wide, thus producing approximately 1-inch wide gaps in these plies. A fourth configuration was similar to the second and third, but the 5 intermediate plies of Board B were approximately 2.5 inches wide, thus producing approximately 1.5-inch wide gaps in these plies. A plurality of tubes of each configuration were tested for ID stiffness and the results were averaged for each configuration. The results are shown in the following table:

| Tube Configuration | All Board A No Gaps | A/B/A No Gaps | A/B/A 1-inch Gaps in B Plies | A/B/A 1.5-inch Gaps in B Plies |
|---|---|---|---|---|
| ID Stiffness ($10^4$ psi/inch) | 4.12 | 4.78 | 7.28 | 8.64 |
| Ratio to All Board A | 1 | 1.16 | 1.77 | 2.10 |

The results show that increasing the compliance of the intermediate zone of the tube wall by simply using a more-compliant paperboard (Board B) produced a modest gain in ID stiffness of about 16 percent compared to an all-Board A tube; however, introducing 1-inch gaps in the Board B plies resulted in a 77 percent gain in ID stiffness compared to the all-Board A tube, and the 1.5-inch gaps more than doubled the all-Board A ID stiffness. Comparing the A/B/A tubes to one another, it can be seen that the tubes with 1-inch ply gaps had an ID stiffness about 52 percent greater than those with no ply gaps; the tubes with 1.5-inch gaps had an ID stiffness about 81 percent greater than those with no gaps. Thus, it is apparent that the ply gaps have a dramatic beneficial effect on ID stiffness.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A spirally wound tube formed to have enhanced ID stiffness under radially inward compressive loads on the tube, the tube comprising:

a plurality of plies spirally wound about an axis and adhered together to form a tube, a wall of the tube comprising a radially inwardly located zone, a radially outwardly located zone, and a radially intermediate zone located between said inwardly and outwardly located zones, each zone comprising at least one paperboard ply;

the intermediate zone including a narrow ply having a width less than that of plies of the inwardly and outwardly located zones, the narrow ply being wound such that a gap exists between adjacent edges of consecutive turns of the narrow ply, the gaps in the intermediate zone causing the intermediate zone to have a greater compliance in a radial direction of the tube than that of the inwardly and outwardly located zones, thereby enhancing the ID stiffness of the tube.

2. The spirally wound tube of claim 1, wherein the gap between adjacent edges of the narrow ply has a width of about 6.5 to 50 percent of the width that the ply would require in order to produce a perfect butt joint when wound at the same spiral wind angle as the narrow ply.

3. The spirally wound tube of claim 1, wherein the gap between adjacent edges of the narrow ply has a width of about 10 to 40 percent of the width that the ply would require in order to produce a perfect butt joint when wound at the same spiral wind angle as the narrow ply.

4. The spirally wound tube of claim 1, wherein the intermediate zone includes more than one narrow ply each having a gap between adjacent edges of consecutive turns of the ply.

5. The spirally wound tube of claim 4, wherein the narrow plies having gaps are non-contiguous with each other.

6. The spirally wound tube of claim 4, wherein the narrow plies having gaps are contiguous with each other and the gaps of adjacent plies are axially staggered relative to each other.

7. The spirally wound tube of claim 1, wherein the intermediate zone includes a ply formed of material having a greater compliance in the radial direction than that of plies in the inwardly and outwardly located zones.

8. The spirally wound tube of claim 7, wherein the ply having the greater compliance is also a narrow ply having gaps between adjacent edges of consecutive turns of the ply.

9. The spirally wound tube of claim 1, wherein the plies in the inwardly and outwardly located zones nominally are wound without gaps between consecutive turns of the plies but may have inadvertent gaps as a result of manufacturing tolerances, and wherein the narrow ply of the intermediate zone is intentionally wound to have gaps between consecutive turns of the ply that are substantially larger than any inadvertently produced gaps in the inwardly and outwardly located zones.

10. The spirally wound tube of claim 1, wherein the inwardly located zone comprises a plurality of plies.

11. The spirally wound tube of claim 1, wherein the outwardly located zone comprises a plurality of plies.

12. The spirally wound tube of claim 1, wherein the intermediate zone comprises a plurality of plies.

13. The spirally wound tube of claim 12, wherein the intermediate zone includes at least one ply that is substantially wider than the narrow ply and is wound at a spiral wind angle substantially equal to that of the narrow ply.

14. A spirally wound paperboard tube formed to have enhanced ID stiffness under radially inward compressive loads on the tube, the tube comprising:

a plurality of paperboard plies wound about an axis at a nominal spiral wind angle $\alpha$ and adhered together to form a tube, each ply being wound at an individual ply diameter $D_i$, the plies comprising at least a radially outwardly located ply, a radially inwardly located ply, and a radially intermediate ply located between the outwardly and inwardly located plies;

wherein each of the outwardly and inwardly located plies has an individual ply width $W_i$ substantially given by $$W_i = \pi D_i \cos \alpha,$$

and the intermediate ply has a width given by $$W = k_i \cdot \pi D_i \cos \alpha,$$

where $k_i$ is a scalar having a value from about 0.5 to about 0.935, whereby gaps exist between adjacent edges of consecutive turns of the intermediate ply, the intermediate ply effectively having a greater compliance in the radial direction of the tube by virtue of the gaps.

15. The spirally wound paperboard tube of claim 14, wherein the tube includes a plurality of intermediate plies between the outwardly and inwardly located plies, a plurality of said intermediate plies having a width given by $W = k_i \cdot D_i \cos \alpha$ such that each of said plies has gaps.

16. The spirally wound paperboard tube of claim 15, wherein contiguous ones of said intermediate plies having gaps are wound such that the respective gaps are axially staggered relative to each other.

17. A method of making a spirally wound tube so as to enhance ID stiffness of the tube under radially inward compressive loads on the tube, the method comprising:

spirally winding from one to a plurality of inner plies about a forming mandrel to form an inner tube wall zone on the mandrel;

spirally winding from one to a plurality of intermediate plies about the inner tube wall zone on the mandrel to form an intermediate tube wall zone; and spirally winding from one to a plurality of outer plies about the intermediate tube wall zone to form an outer tube wall zone;

contiguous plies being adhered together to form a tube;

the inner and outer plies being wound with substantially zero gaps between adjacent edges of consecutive turns of the plies;

at least one intermediate ply being provided to have substantial nonzero gaps between adjacent edges of consecutive turns of the ply so as to increase the compliance of the intermediate tube wall zone in the radial direction of the tube, thereby enhancing ID stiffness of the tube.

18. The method of claim 17, wherein a plurality of intermediate plies are provided to have substantial nonzero gaps between adjacent edges of consecutive turns of the plies.

19. The method of claim 17, wherein said at least one intermediate ply is provided such that the gap between adjacent edges of the ply constitutes from about 6.5 percent to about 50 percent of the width that the ply would require in order to produce a perfect butt joint when wound at the same spiral wind angle as the intermediate ply.

20. The method of claim 17, wherein said at least one intermediate ply is provided such that the gap between adjacent edges of the ply constitutes from about 10 percent to about 40 percent of the width that the ply would require in order to produce a perfect butt joint when wound at the same spiral wind angle as the intermediate ply.

21. The method of claim 17, wherein the gaps between adjacent edges of the one intermediate ply are created by providing the intermediate ply to have a width substantially less than that of the inner and outer plies and winding the intermediate ply at substantially the same spiral wind angle as that of the inner and outer plies.

22. The method of claim 21, wherein the one intermediate ply prior to winding is adhered to one of the inner and outer plies to form a two-ply laminate, and the two-ply laminate is then wound.

23. The method of claim 21, wherein the one intermediate ply is positioned in an axial direction of the mandrel during winding by using a ply positioning arrangement for positioning the ply in a desired axial location such that the gap is produced.

* * * * *